United States Patent Office 2,957,781
Patented Oct. 25, 1960

2,957,781

ORGANOSILICON COMPOUNDS AND PROCESSES FOR PRODUCING THE SAME

Donald L. Bailey, Snyder, and Ronald M. Pike, Grand Island, N.Y., assignors to Union Carbide Corporation, a corporation of New York No Drawing. Filed Oct. 12, 1956, Ser. No. 615,493

20 Claims. (Cl. 117—33.3)

This invention relates to organosilicon compounds and to processes for their production. More particularly this invention is concerned with organosilicon compounds containing, among other possible functional groups, the sulfonamido group, which is linked to the silicon atom through a polymethylene chain of at least 3 carbon atoms, as new compositions of matter. This invention is also concerned with processes for producing the organosilicon compounds contemplated above and to uses thereof.

The present invention is based upon our discovery that organosilicon compounds containing an organo-substituted sulfonamido group ($ArSO_2NH-$) attached to a silicon atom through a polymethylene linkage can be produced by reacting an organosilicon compound containing the aminoalkylsilyl grouping ($H_2N(CH_2)_aSi\equiv$) with an organosulfonyl halide, as represented by the following equation:

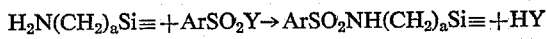

wherein $a$ is an integer having a value of at least 3; Y represents a halogen atom; and Ar represents a monovalent hydrocarbon radical or a monovalent heterocyclic radical.

According to our studies the reaction is a general one and is applicable to all organosilicon compounds which contain the aminoalkylsilyl grouping depicted above. Suitable for use in our process are the aminoalkylalkoxysilanes and the aminoalkylpolysiloxanes, including copolymeric materials which contain both aminoalkylsiloxane and hydrocarbon siloxane units.

Typical of the aminoalkylalkoxysilanes suitable for use as our organosilicon starting materials are those compounds represented by the structural formula:

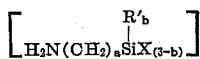

wherein R' represents an alkyl group such as methyl, ethyl, propyl, butyl and the like, or an aryl group such as phenyl, naphthyl, tolyl and the like, or an aralkyl group such as benzyl and the like, X represents an alkoxy group such as methoxy, ethoxy, propoxy and the like, $a$ is an integer having a value of at least 3 and preferably a value of from 3 to 4 and $b$ is an integer having a value of from 0 to 2 and preferably a value of from 0 to 1. Illustrative of such aminoalkylalkoxysilanes are gamma-aminopropyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylmethyldiethoxysilane, delta-aminobutylethyldiethoxysilane, delta-aminobutylphenyldiethoxysilane and the like.

Typical of the aminoalkylpolysiloxanes suitable for use as our organosilicon starting materials are those polysiloxanes which contain the structural unit:

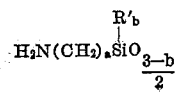

wherein R', $a$ and $b$ have the same values described above. Such polysiloxanes are prepared by the hydrolysis and condensation of those aminoalkylalkoxysilanes described above or by the co-hydrolysis and co-condensation of such aminoalkylalkoxysilanes with other hydrolyzable silanes and can include: aminoalkylpolysiloxanes of the trifunctional variety (i.e. where $b=0$), aminoalkylalkyl- and aminoalkylarylpolysiloxanes of the difunctional variety which include cyclic or linear polysiloxanes (i.e. where $b=1$) and linear aminoalkyldialkyl-, aminoalkyldiaryl- and aminoalkylalkylaryldisiloxanes of the monofunctional variety (i.e. where $b=2$) as well as mixtures of compounds produced by the cohydrolysis of difunctional and trifunctional aminoalkylsilanes.

Suitable starting aminoalkylpolysiloxanes of the trifunctional variety can be more specifically depicted as containing the structural unit:

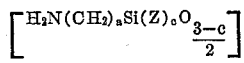

wherein $a$ has the value previously described, Z represents an hydroxyl or alkoxy group and $c$ has an average value of from 0 to 1, and can be as high as 2; preferably from 0.1 to 1. Aminoalkylpolysiloxanes of this variety which are essentially free of silicon-bonded alkoxy or hydroxyl groups (i.e. where $c=0$) can be prepared by the complete hydrolysis and complete condensation of aminoalkyltrialkoxysilanes, whereas aminoalkylpolysiloxanes which contain silicon-bonded alkoxy groups can be prepared by the partial hydrolysis and complete condensation of the same starting silanes. On the other hand, aminoalkylpolysiloxanes which contain silicon-bonded hydroxyl groups can be prepared by the complete hydrolysis and partial condensation of the same aminoalkyltrialkoxysilanes. By way of illustration, a gamma-aminopropylpolysiloxane containing silicon-bonded ethoxy groups can be prepared by hydrolyzing gamma-aminopropyltriethoxysilane with an amount of water insufficient to react with all of the silicon-bonded ethoxy groups present on the starting silane and subsequently condensing the hydrolyzates so formed to produce the desired polymer.

Suitable starting aminoalkylpolysiloxanes of the difunctional variety, which include cyclic and linear polysiloxanes, can be more specifically defined by the structural formula:

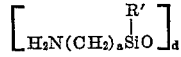

wherein R' and $a$ have the values previously described and $d$ is an integer having a value of at least 3 and can be as high as 7 for the cyclic aminoalkylsiloxanes and higher for the linear aminoalkylpolysiloxanes. Such cyclic and linear aminoalkylpolysiloxanes can be prepared by the hydrolysis and condensation of aminoalkylalkyl- or aminoalkylaryldiethoxysilanes. In carrying out the hydrolysis and condensation procedures there is produced a product comprising a mixture of cyclic and linear polysiloxanes from which the desired polysiloxane can be recovered. Illustrative of the cyclic aminoalkylsiloxanes suitable for use as the organosilicon starting material in our process are the cyclic tetramer of gamma-aminopropylmethylsiloxane, the cyclic tetramer of delta-aminobutylphenylsiloxane and the like. Illustrative of suitable linear aminoalkylpolysiloxanes are gamma-aminopropylmethylpolysiloxane, gamma-aminopropylethylpolysiloxane, delta-aminobutylmethylpolysiloxane and the like.

Included among the useful starting linear aminoalkylpolysiloxanes are the alkyl, alkoxy and hydroxyl endblocked polysiloxanes which contain from 1 to 3 of such groups bonded to the terminal silicon atoms of the molecules comprising the polymeric chains. Thus we can also employ as our starting materials such linear end-blocked aminoalkylpolysiloxanes as monoethoxy end-blocked gamma-aminopropylethylpolysiloxane or methyldiethoxysilyl end-blocked delta-aminobutylmethylpolysiloxane or monoethoxydimethylsilyl end-blocked gamma-aminopropylphenylpolysiloxane and the like. The end-blocked linear aminoalkylalkyl- and aminoalkylarylpolysiloxanes useful in our process can be prepared by the equilibration of cyclic aminoalkylsiloxanes with silicon compounds containing predominantly silicon-bonded alkoxy groups, or by the co-hydrolysis and condensation of trialkylalkoxysilanes with aminoalkylalkyl- or aminoalkylaryldiethoxysilanes. Hydroxy end-blocked linear polysiloxanes can be prepared by heating linear or cyclic aminoalkylpolysiloxanes with water.

The copolymeric aminoalkylpolysiloxanes which can be employed as a starting material can be depicted as containing both of the structural units:

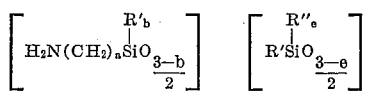

wherein R', a and b have the values described above, R'' represents an alkyl or aryl group and e is an integer having a value of from 0 to 2. Our copolymers can be mixtures of trifunctional aminoalkylsiloxane units (where $b=0$) with trifunctional alkyl-, aryl- or mixed alkyl- and aryl- siloxane units (where $e=0$) or with difunctional alkyl, aryl- or mixed alkyl- and arylsiloxane units (where $e=1$). They can also include mixtures of difunctional aminoalkylsiloxane units (where $b=1$) with trifunctional alkyl-, aryl- or mixed alkyl- and aryl units (where $e=0$) or with difunctional alkyl-, aryl- or mixed alkyl- and arylsiloxane units (where $e=1$).

Those copolymers which contain trifunctional aminoalkylsiloxane units and other siloxane units are preferably prepared by the co-hydrolysis and co-condensation of the corresponding alkoxysilane starting materials. Such copolymers can contain silicon-bonded hydroxyl or alkoxy groups or they can comprise essentially completely condensed materials. The linear copolymeric siloxanes are preferably prepared by the separate hydrolysis and condensation of an aminoalkylalkyl- or aminoalkylaryldialkoxysilane and the dialkyl- or diaryldialkoxysilane to cyclic aminoalkylsiloxanes and cyclic dialkyl- or diarylsiloxanes and subsequently equilibrating mixtures of such cyclic siloxanes to linear copolymers. Such linear copolymers can also contain chain-terminating or end-blocking groups such as alkyl, alkoxy or hydroxyl groups. The equilibration will also produce some copolymeric cyclic siloxanes.

The aminoalkylalkoxysilanes and aminoalkylpolysiloxanes as well as copolymers containing aminoalkylsiloxanes and hydrocarbon siloxane units are all disclosed and claimed as new compositions of matter in copending U.S. applications Serial Nos. 615,466, 615,481, 615,483 and 615,507 and filed concurrently herewith; Serial Nos. 615,481 and 615,483 are now abandoned. Processes for producing such compounds are also disclosed and claimed in said copending applications.

The organosulfonyl halides that can be used in the process of this invention for the production of the unique sulfonamido-containing silicon compounds herein disclosed may be represented by the formula: $ArSO_2Y$, wherein Ar represents a monovalent hydrocarbon radical, either substituted or unsubstituted, or a monovalent heterocyclic radical and Y represents a halogen atom such as bromine, fluorine, chlorine or iodine, but preferably chlorine.

The monovalent hydrocarbon radical, Ar, may be an aliphatic alkyl radical containing from one to about 16 carbon atoms; or it may be an aryl radical such as, for example, phenyl or naphthyl, and said aryl radical may, if desired, be substituted by one or more substituents such as alkyl radicals, alkoxy radicals, aryl radicals, amino radicals, nitro radicals, acylamino radicals, hydroxyl radicals, carboxyl radicals, sulfo radicals, halogen atoms, benzoyl radicals, substituted benzoyl radicals such as, for example, the 2,4-dihydroxy benzoyl radical, aralkyl radicals, alkaryl radicals, etc.; in addition, Ar may represent an heterocyclic radical such as a nitrogen-containing heterocyclic radical, for example pyridyl, benzimidazolyl or pyrolidyl; or an oxygen-containing heterocyclic radical, for example, furfuryl; or a sulfur-containing heterocyclic radical, for example thienyl.

In general, the reaction is carried out by admixing the aminoalkyl silicon compound with the organosulfonyl halide by the slow addition of one of the starting reactants to the other at temperatures maintained below about 100° C. With low molecular weight alkyl sulfonyl halides (4 carbon atoms or less) the addition is best conducted at temperatures below about 20° C.

The reaction between the aminoalkyl silicon compound and the organosulfonyl halide can be carried out in the presence of solvents, preferably water immiscible solvents such as the hydrocarbon solvents as, for example, benzene, toluene or xylene; or halocarbon solvents such as, for example, carbon tetrachloride or chloroform; or ethers such as, for example, diethyl ether or petroleum ether. The amount of solvent employed is not narrowly critical and can vary over a wide range. If desired, and where the solvent permits, the reaction can be carried out under a slight vacuum so as to remove the hydrohalic acid produced during the reaction and thus favor formation of the corresponding sulfonamido-containing silicon compound.

In the absence of basic catalysts the reaction of the functional aminoalkyl silicon compounds with an organo sulfonyl halide proceeds to the formation of the corresponding aminoalkyl sulfonamido silicon compound. However, the addition of a basic catalyst not only serves to hasten the reaction, regardless of whether the starting aminoalkyl silicon compound is monomeric or polymeric, but in the case of hydrolyzable silicon compounds there also occurs hydrolysis with formation of silanol groups when hydroxyl-containing basic catalysts are used. Compounds suitable for use as catalysts include the organic amines such as, for example, pyridine, piperidine, quinoline, triethylamine, etc.; or the basic inorganic compounds such as, for example, ammonium hydroxide, anhydrous ammonia, sodium hydroxide, potassium hydroxide, sodium carbonate, sodium bicarbonate, sodium acetate, etc.

We have found that stoichiometric quantities of organo sulfonyl halide to aminoalkyl groups present in the silicon compound can be used in the process of this invention and that higher ratios of sulfonyl halide to aminoalkyl groups present in the silicon compound are preferred. For example, ratios as high as 3:1 may be used to insure complete utilization of the amioalkyl silicon compound.

The monomeric silicon-containing sulfonamides produced by the processes of this invention can be represented by the following formula:

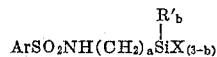

wherein Ar, R', X, a and b have the same values described above.

The polymeric silicon-containing sulfonamides produced in this invention are the siloxane polymers comprising units represented by the formula:

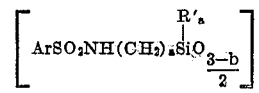

and siloxane copolymers containing units represented by the following formulae:

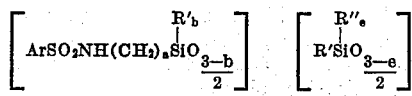

wherein Ar, R', R", a, b and e have the same values as described above; and wherein the polymeric siloxane compounds may contain alkoxy or hydroxyl groups bonded to some of the silicon atoms.

The novel monomeric and polymeric silicon compounds produced by the processes of the present invention are useful as intermediates in the production of sulfonamidoalkylsiloxy-modified silicones and organic derivatives. The siloxane polymers and copolymers can be produced as oils which are useful as lubricants, and as silicone elastomeric compounds, or as solid resins useful for molding or extruding purposes. They also find use as ultraviolet absorbers, for example, to stabilize films against light degradation, as insecticides, fungicides and protective coatings.

The following examples further serve to illustrate the invention.

Example 1

A 100 ml. three-necked Pyrex flask equipped with a stirrer, condenser, thermometer and dropping funnel was charged with 5.4 grams of gamma-aminopropyltriethoxysilane and 10 ml. of anhydrous diethyl ether. In a dropwise manner at about 20° C. a solution of 4 grams of 2,4-dihydroxybenzophenone-4'-sulfonyl chloride in 15 ml. of anhydrous ether was added. On mixing the two reactants the mixture turned yellow and became warm. The solution was then heated at reflux, about 35° C., under a nitrogen atmosphere, for 17 hours. During this period a white precipitate of gamma-aminopropyltriethoxysilane hydrochloride formed. This precipitate was filtered off and the filtrate concentrated at room temperature under reduced pressure. There was recovered 4.2 grams of 2,4-dihydroxybenzophenone - 4' - sulfonamide, N - triethoxysilylpropyl, which can be represented by the graphic formula:

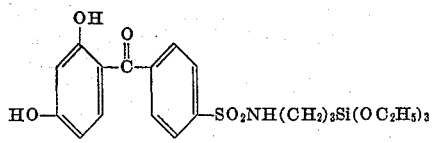

The sulfonamide produced was soluble in acetone, benzene and chloroform; but insoluble in methanol, ethanol and water. This product is an excellent ultraviolet absorber in the 2500 to 3300 A. range. The percent transmission in the ultraviolet light range through a solution of 1 cm. thickness containing 0.072 gram per liter of chloroform is given below:

| Wavelength, A.: | Percent transmission |
|---|---|
| 2500 | 3.0 |
| 2600 | 4.5 |
| 2700 | 7.0 |
| 2800 | 8.5 |
| 2900 | 13.0 |
| 3000 | 21.5 |
| 3100 | 23.0 |
| 3200 | 19.0 |
| 3300 | 19.0 |

Example 2

A mixture of 22.1 grams of gamma-aminopropyltriethoxysilane and 7.9 grams of pyridine was prepared in a 500 ml. Pyrex flask. In a dropwise manner, while agitating this mixture there was slowly added thereto a solution of 19.1 grams of p-toluene sulfonyl chloride in 300 ml. of benzene; the temperature rose to about 50° C. during the addition. The stoppered flask was allowed to stand at room temperature for about one-half hour and then refluxed for 5 hours during which period a small amount of white precipitate formed. After heating, the reaction product was allowed to cool to room temperature and then was washed in a separatory funnel as follows: once with 50 ml. of aqueous 5% potassium carbonate solution, once with 50 ml. of distilled water and three times with 50 ml. portions of aqueous 5% sulfuric acid. The benzene layer was dried over 40 grams of calcium sulfate for one and one-half hours, filtered and then concentrated to about one-quarter volume. Added two portions of 100 ml. of 95% ethanol and reconcentrated each time to about one-quarter volume. Then filtered into 50 ml. of 95% boiling ethanol and let stand overnight. The next day the mixture was filtered to remove about 0.2 gram of a yellow resinous solid. The filtrate was concentrated to remove solvents at a maximum pot temperature of 120° C. and a minimum pressure of about 1 mm. of mercury. The p-toluenesulfonamide, N-ethoxydihydroxysilylpropyl produced, which can be represented by the graphic formula:

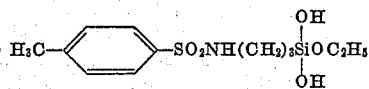

was a dark amber viscous oil weighing 19.3 grams. Infra-red data indicated the presence of —NH—, —C=C— (phenyl), ≡SiOH, and —SO$_2$— bonding. There was no evidence of free —NH$_2$ bonding present.

Example 3

Placed 22.1 grams of gamma-aminopropyltriethoxysilane in a 250 ml. Pyrex flask, and with good agitation slowly added 19.1 grams of p-toluene sulfonyl chloride. The sulfonyl chloride immediately went into solution and the temperature rapidly rose to 75° C. The mixture was cooled externally so that a temperature of about 50° C. was established. In about 10 minutes crystallization started and shortly thereafter the entire contents of the reaction flask solidified. The p-toluenesulfonamide, N-triethoxysilylpropyl produced can be represented by the graphic formula:

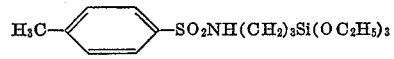

Added 40 ml. of 2.5 N sodium hydroxide solution of the reaction mixture but only a small amount of material dissolved. Therefore, added 50 ml. of benzene and two liquid phases formed which were separated from each other. The benzene phase, containing the p-toluenesulfonamide, N-triethoxysilylpropyl dissolved therein, was washed as follows: once with 50 ml. of distilled water and once with 50 ml. of aqueous 5% potassium carbonate solution. The washed benzene layer was dried over 15 gram of calcium sulfate, filtered and then concentrated to one-quarter volume. Added two portions of 50 ml. of 95% ethanol and reconcentrated each time to about one-quarter volume. Then filtered into 50 ml. of 95% ethanol and reconcentrated to one quarter volume. On standing a dark amber viscous oil separated out; this was decanted off and concentrated at 75° C. at a pressure of 1 mm. of mercury leaving a residue of 31.2 grams of p - toluenesulfonamide, N - ethoxydihydroxysilylpropyl which can be represented by the graphic formula:

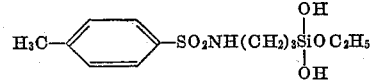

Calculated for C$_{12}$H$_{21}$O$_5$NSiS: C, 45.3; H, 6.6; N, 4.4; Si, 8.8; S, 10.4. Found: C, 45.1; H, 6.9; N, 3.9; Si, 8.0; S, 10.4. Infra-red data confirmed the presence of —NH—, —C=C— (phenyl), ≡SiOH, and —SO$_2$— bonding. There was no evidence of free —NH$_2$ bonding present.

Example 4

In a 500 ml. Pyrex flask equipped with a magnetic stirrer, thermometer and vacuum outlet were placed 50 grams of a 500 molecular weight dimethylsilicone oil containing 24 weight-percent of delta-aminobutylmethylsiloxy units and 100 ml. of benzene. At a temperature not exceeding 40° C. added 17.6 grams of p-toluene sulfonyl chloride in four approximately equal increments. The reaction mixture was further stirred until the temperature dropped to about 25° C. and then let stand for 18 hours. The mixture was saturated with anhydrous ammonia gas by bubbling the ammonia through the solution. The ammonia addition caused an exothermic reaction and an ice bath was used to keep the temperature below 60° C. When the exothermic reaction ceased and the temperature started to decrease, the addition of ammonia was continued for one-half hour and then the reaction mixture was cooled to room temperature without further addition of ammonia. During the ammonia addition a flocculent white precipitate formed. The reaction mixture was mixed with 500 ml. of petroleum ether and 20 grams of diatomaceous earth were added. Filtered through a sintered glass funnel and distilled the filtrate as follows: at atmospheric pressure to a head temperature of 85° C. and a maximum pot temperature of 150° C. over a 1.5 hours period, at 1 mm. mercury pressure at a maximum pot temperature of 150° C. over a 2 hour period. The sulfonamide-containing silicone oil remaining in the flask was a light amber colored product with the following physical properties: $n_D^{25}$ 1.4576; viscosity at 25° C. 2600 centipoises. Yield was 55.8 grams; and the product can be represented by the following formula:

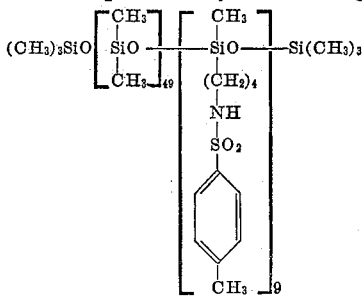

Example 5

A Pyrex flask equipped as described in Example 4 was charged with 61.5 grams of delta-aminobutylmethyldiethoxysilane and 200 ml. of chloroform. The solution was chilled to 50° C. and with good stirring, at such a rate that the temperature of the reaction mixture did not exceed 40° C. while the flask was immersed in an ice bath, there was added 34.2 grams of methane sulfonyl chloride in a dropwise manner over a one-half hour period. A partial vacuum was applied for one hour at 25° C. and then the reaction mixture was allowed to stand at atmospheric pressure and room temperature for 18 hours. The reaction mixture was saturated with anhydrous ammonia at a temperature not exceeding 60° C. as described in Example 4. Ammonia addition was continued for about one-half hour after the exothermic reaction had ceased and then the mixture was cooled to room temperature. Added 500 ml. of petroleum ether to the reaction mixture and filtered to remove the white precipitate which had formed during the ammonia saturation. The filtrate was distilled in the same manner as described in Example 4. The methane sulfonamide, N-diethoxymethylsilylbutyl remaining in the flask was a clear water colored oil which weighed 90 grams and had the following physical properties: $n_D^{25}$ 1.4525; viscosity at 25° C. 35 centipoises. The product can be represented by the following formula:

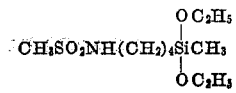

Example 6

A clear light yellow solution of 2,4-dihydroxybenzophenone-4'-sulfonamide, N-triethoxysilylpropyl was prepared by adding 0.15 gram of said sulfonamide to 10 ml. of methanol and then adding 4 drops of an aqueous 20% potassium hydroxide solution.

A. A glass slide was washed in concentrated hydrochloric acid, rinsed with distilled water, dipped for 2 minutes in a 1% vinyltriethoxysilane solution (75 parts of ethanol, 24 parts of water and 1 part of 50% aqueous potassium hydroxide), and then dried at 110° C. for 10 minutes. The sized slide was then dipped into the above sulfonamido silicon compound solution for 5 minutes, dried in air, and then heated at 275° C. for 10 minutes. A clear, slightly yellow film was formed on the slide.

B. A glass slide was washed and rinsed as above, dipped for 2 minutes in a 1% gamma-aminopropyltriethoxysilane water solution, and dried at 110° C. for 10 minutes. The sized slide was then treated with the above sulfonamido silicon compound solution, as described above in A, and a clear slightly yellow film resulted.

The percent transmission of ultraviolet light of the coated slides is given below:

| Wavelength, A. | Percent Transmission | |
|---|---|---|
| | A | B |
| 3,100 | 6.0 | 4.5 |
| 3,200 | 11.5 | 8.0 |
| 3,300 | 12.0 | 6.5 |
| 3,400 | 10.5 | 6.5 |
| 3,500 | 10.5 | 6.5 |
| 3,600 | 12.0 | 7.0 |
| 3,700 | 17.5 | 10.5 |

What is claimed is:

1. Process for the production of sulfonamido-containing silicon compounds selected from the group consisting of sulfonamide silanes represented by the formula:

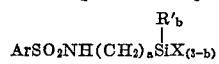

wherein Ar represents a member selected from the group consisting of monovalent aliphatic alkyl radicals containing from 1 to about 16 carbon atoms, monovalent aryl radicals, monovalent nitrogen-containing heterocyclic radicals, monovalent oxygen-containing heterocyclic radicals and monovalent sulfur-containing heterocyclic radicals; R' represents a member selected from the group consisting of alkyl radicals, alkaryl radicals and aryl radicals; X represents a lower alkoxy radical; $a$ is an integer having a value of at least 3 wherein the $(CH_2)_a$ group is a lower alkylene group; and $b$ is an integer having a value of from 0 to 2; which comprises admixing an aminoalkyl silane selected from the group consisting of silanes represented by the formula:

wherein R', X, $a$ and $b$ have the same meanings hereinbefore indicated, with an organo sulfonyl halide and heating the aminoalkyl silane and organo sulfonyl halide represented by the general formula $ArSO_2Y$, wherein Ar has the same meanings as defined above; and Y represents a halogen atom, at a temperature up to the reflux temperature of the reaction mass such as to effect elimination of hydrohalic acid and formation of a sulfonamido silane.

2. Process for the production of sulfonamido-containing silicon compounds selected from the group consisting of polysiloxane polymers containing units represented by the formula:

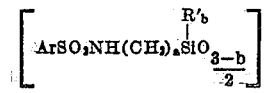

wherein Ar represents a member selected from the group consisting of monovalent aliphatic alkyl radicals containing from 1 to about 16 carbon atoms, monovalent aryl radicals, monovalent nitrogen-containing heterocyclic radicals, monavalent oxygen-containing heterocyclic radicals and monovalent sulfur-containing heterocyclic radicals; R' represents a member selected from the group consisting of alkyl radicals, alkaryl radicals and aryl radicals; $a$ is an integer having a value of at least 3 wherein the $(CH_2)_a$ group is a lower alkylene group; and $b$ is an integer having a value from 0 to 2, which comprises admixing an aminoalkylpolysiloxane with an organo sulfonyl halide represented by the general formula $ArSO_2Y$, wherein Ar has the same meanings as defined above, and Y represents a halogen atom, and heating the aminoalkylpolysiloxane and organo sulfonyl halide at a temperature up to the reflux temperature of the reaction mass, such as to effect elimination of hydrohalic acid and formation of the sulfonamidopolysiloxane.

3. Sulfonamido silanes selected from the group consisting of silanes represented by the formula:

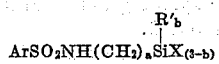

wherein Ar represents a member selected from the group consisting of monovalent aliphatic alkyl radicals containing from 1 to about 16 carbon atoms, monovalent aryl radicals, monovalent nitrogen-containing heterocyclic radicals, monovalent oxygen-containing heterocyclic radicals and monovalent sulfur-containing heterocyclic radicals; R' represents a member selected from the group consisting of alkyl radicals, alkaryl radicals and aryl radicals; X represents a lower alkoxy hadical; $a$ is an integer having a value of at least 3 wherein the $(CH_2)_a$ group is a lower alkylene group; and $b$ is an integer having a value of from 0 to 2.

4. Sulfonamido-containing polysiloxanes selected from the group consisting of polysiloxane polymers containing units represented by the formula:

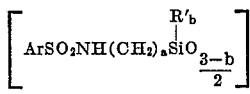

wherein Ar represents a member selected from the group consisting of monovalent aliphatic alkyl radicals containing from 1 to about 16 carbon atoms, monovalent aryl radicals, monovalent nitrogen-containing heterocyclic radicals, monovalent oxygen-containing heterocyclic radicals and monovalent sulfur-containing heterocyclic radicals; R' represents a member selected from the group consisting of alkyl radicals, alkaryl radicals and aryl radicals; $a$ is an integer having a value of at least 3 wherein the $(CH_2)_a$ group is a lower alkylene group; and $b$ is an integer having a value from 0 to 2.

5. The process as claimed in claim 1, wherein an aminoalkyl-alkoxysilane is reacted with an organo sulfonyl halide for the production of a sulfonamido-containing silane, and further comprising the steps of hydrolyzing and condensing the sulfonamido-containing silane to produce a corresponding sulfonamido-containing polysiloxane.

6. The process as claimed in claim 1, wherein the aminoalkyl silane is gamma-aminopropyltriethoxysilane and the organo sulfonyl halide is 2,4-dihydroxy-benzophenone-4'-sulfonyl chloride, and the sulfonamido silane produced is represented by the formula:

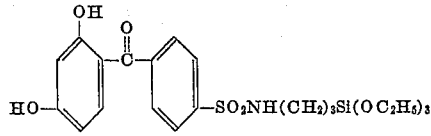

7. The process as claimed in claim 1, wherein the aminoalkyl silane is gamma-aminopropyltriethoxysilane and the organo sulfonyl halide is p-toluene sulfonyl chloride, and the sulfonamido silane produced under anhydrous conditions is represented by the formula:

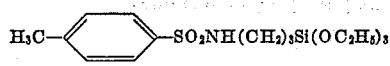

8. The process as claimed in claim 1, wherein the aminoalkyl silane is gamma-aminopropyltriethoxysilane and the organo sulfonyl halide is p-toluene sulfonyl chloride, and the sulfonamido silane produced when moisture is present is represented by the formula:

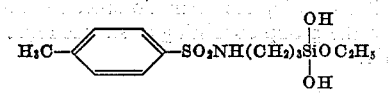

9. The process as claimed in claim 1, wherein the aminoalkyl silane is delta-aminobutylmethyldiethoxysilane and the organic sulfonyl halide is methane sulfonyl chloride, and the sulfonamido silane produced is methane sulfonamide, N-diethoxymethylsilyl butyl, which is represented by the formula:

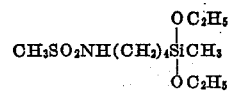

10. The process as claimed in claim 2, wherein the aminoalkylpolysiloxane is a 5000 molecular weight dimethylsilicone oil containing 24 weight percent of delta-aminobutylmethylsiloxy units and the organo sulfonyl halide is p-toluene sulfonyl chloride, and the sulfonamidopolysiloxane produced is represented by the following formula:

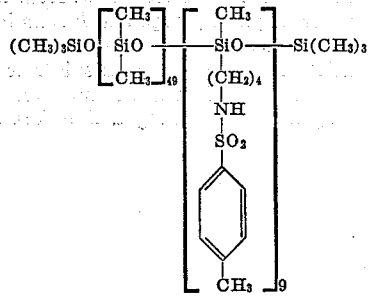

11.

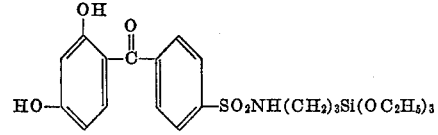

12.

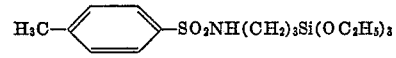

13.

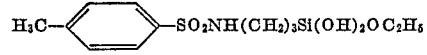

14.

15.

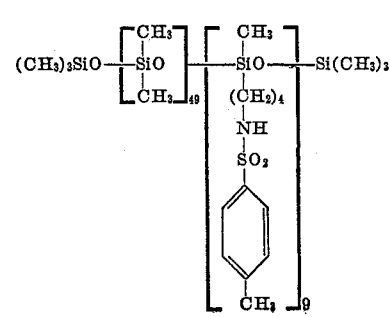

16. An improved ultraviolet light absorbing film, comprising the film-forming sulfonamido silicon compound represented by the graphic formula:

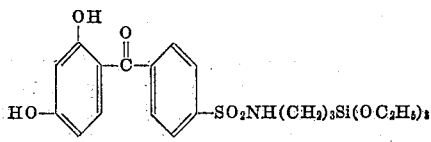

17. An improved ultraviolet light absorbing film, comprising a film forming sulfonamido silicon compound selected from the group consisting of silanes represented by the formula:

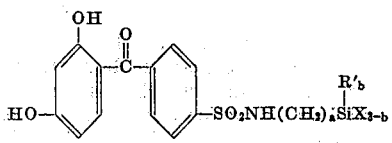

and siloxane polymers containing the unit represented by the general formula:

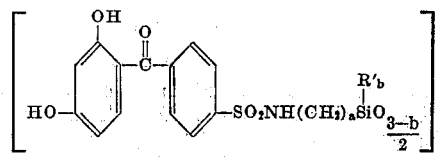

wherein $R'$ represents a member selected from the group consisting of alkyl radicals, aryl radicals, and alkaryl radicals; X represents a lower alkoxy radical; $a$ is an integer having a value of at least 3 wherein the $(CH_2)_a$ group is a lower alkylene group; and $b$ is an integer having a value of from 0 to 2.

18. An article comprising a glass substrate coated on at least one side thereof with an improved ultraviolet light absorbing film, comprising a film forming sulfonamido silicon compound selected from the group consisting of silanes represented by the formula:

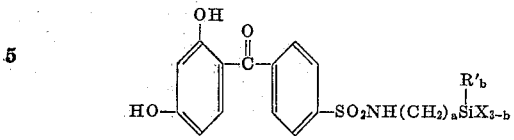

and siloxane polymers containing the unit represented by the general formula:

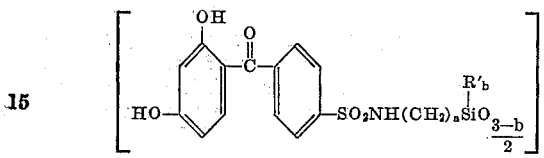

wherein $R'$ represents a member selected from the group consisting of alkyl radicals, aryl radicals and alkaryl radicals; X represents a lower alkoxy radical; $a$ is an integer having a value of at least 3 wherein the $(CH_2)_a$ group is a lower alkylene group; and $b$ is an integer having a value of from 0 to 2.

19. Process as claimed in claim 1, wherein the reaction is carried out in the presence of a liquid organic solvent and a basic catalyst.

20. Process as claimed in claim 2, wherein the reaction is carried out in the presence of a liquid organic solvent and a basic catalyst.

References Cited in the file of this patent
UNITED STATES PATENTS

| | | |
|---|---|---|
| 2,321,891 | Berchet | June 15, 1943 |
| 2,401,155 | Hentrich | May 28, 1946 |
| 2,600,806 | Reynolds et al. | June 17, 1952 |
| 2,762,823 | Speier | Sept. 11, 1956 |

UNITED STATES PATENT OFFICE
CERTIFICATION OF CORRECTION

Patent No. 2,957,781                          October 25, 1960

Donald L. Bailey et al.

It is hereby certified that error appears in the above numbered patent requiring correction and that the said Letters Patent should read as corrected below.

Column 4, line 58, for "amioalkyl" read -- aminoalkyl --; lines 72 to 75, the formula should appear as shown below instead of as in the patent:

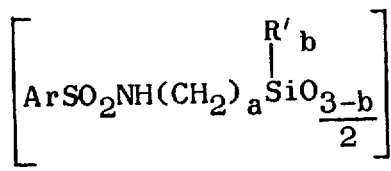

column 5, lines 52 and 56, for "A.", each occurrence, read -- $\overset{o}{A}$. --; column 8, in the table, heading to the first column thereof, for "Wavelength, A." read -- Wavelength, $\overset{o}{A}$. --; column 9, line 33, for "hadical" read -- radical --; column 10, line 17, for "organic" read -- organo --.

Signed and sealed this 9th day of May 1961.

(SEAL)
Attest:

ERNEST W. SWIDER
Attesting Officer

DAVID L. LADD
Commissioner of Patents